United States Patent [19]
Ramalingam

[11] Patent Number: 6,058,363
[45] Date of Patent: May 2, 2000

[54] METHOD AND SYSTEM FOR SPEAKER-INDEPENDENT RECOGNITION OF USER-DEFINED PHRASES

[75] Inventor: Coimbatore S. Ramalingam, Dallas, Tex.

[73] Assignee: Texas Instruments Incorporated, Dallas, Tex.

[21] Appl. No.: 08/999,437

[22] Filed: Dec. 29, 1997

Related U.S. Application Data

[60] Provisional application No. 60/034,477, Jan. 2, 1997.

[51] Int. Cl.[7] .................................. G10L 9/08; G10L 5/00
[52] U.S. Cl. ........................ 704/251; 704/255; 704/256; 704/257
[58] Field of Search ..................................... 704/251, 255, 704/256, 257; 379/88

[56] References Cited

U.S. PATENT DOCUMENTS

| | | | |
|---|---|---|---|
| 5,710,864 | 1/1998 | Juang et al. | 704/238 |
| 5,719,921 | 2/1998 | Vysotsky et al. | 379/88 |
| 5,732,187 | 3/1998 | Scruggs et al. | 704/251 |
| 5,832,063 | 11/1998 | Vysotsky et al. | 379/88 |

FOREIGN PATENT DOCUMENTS

| | | |
|---|---|---|
| 0 562 138 A1 | 9/1993 | European Pat. Off. . |
| 0 664 535 A2 | 7/1995 | European Pat. Off. . |

OTHER PUBLICATIONS

Jeffrey Scruggs, Barbara Wheatley, Abraham Ittycheriah, "Speaker–Dependent Speech Recognition Using Speaker–Independent Models," Aug. 23, 1991.

Ayman Asadi, Richard Schwartz and John Makhoul, "Automatic Detection of New Words in a Large Vocabulary Continuous Speech Recognition System," *IEEE*, pp. 125–128, 1990.

Sheryl R. Young, "Detecting Misrecognitions and Out–of–Vocabulary Words," *IEEE*, pp. II–21–II–24, 1994.

C.S. Ramalingam, Lorin Netsch and Yu–Hung Kao, "Speaker–Independent Name Dialing with Out–of–Vocabulary Rejection," *IEEE*, pp. 1475–1478, 1997.

M. Pawlewski, et al., "Advances in Telephony–Based Speech Recognition," *BT Technology Journal*, vol. 14, No. 1, pp. 127–149, Jan. 1996.

*Primary Examiner*—David R. Hudspeth
*Assistant Examiner*—Susan Wieland
*Attorney, Agent, or Firm*—Robert L. Troike

[57] ABSTRACT

Method and system of determining an out-of-vocabulary score for speaker-independent recognition of user-defined phrases comprises enrolling a user-defined phrase with a set of speaker-independent (SI) recognition models using an enrollment grammar. An enrollment grammar score of the spoken phrase may be determined by comparing features of the spoken phrase to the SI recognition models using the enrollment grammar. The enrollment grammar score may be penalized to generate an out-of-vocabulary score.

20 Claims, 2 Drawing Sheets

METHOD AND SYSTEM FOR SPEAKER-INDEPENDENT RECOGNITION OF USER-DEFINED PHRASES

This application claims benefit of provisional application Ser. No. 60/034,477, filed Jan. 2, 1997.

TECHNICAL FIELD OF THE INVENTION

The present invention relates generally to the field of speech processing, and more particularly to a method and system for speaker-independent recognition of user-defined phrases.

BACKGROUND OF THE INVENTION

Demand for voice-activated user-customizable applications such as voice-based speed-dialing is increasing rapidly. Templates used for recognition may be either speaker-dependent or speaker-independent. Speaker-dependent templates are acoustic models derived from the speaker's utterance. Typically, speaker-dependent templates employ "garbage" models against which user-defined phrases are scored to provide out-of-vocabulary rejection. Speaker-dependent templates are problematic in that they generally require large amounts of memory that grows correspondingly with each phrase and user added.

Speaker-independent templates utilize fixed acoustic models and may require only a few hundred bytes of storage for user-defined phrases. As a result, speaker-independent templates may accommodate a large number of users and user-defined phrases with very little increase in memory storage. A problem with speaker-independent templates, however, is that garbage models do not function well in the speaker-independent environment. This results in poor out-of-vocabulary rejection, which can lead to costly errors such as dialing a wrong phone number.

SUMMARY OF THE INVENTION

Accordingly, a need has arisen in the art for an improved speaker-independent recognition system with good out-of-vocabulary rejection capability. The present invention provides a speaker-independent recognition system and method that substantially reduces or eliminates problems associated with prior systems.

In accordance with the present invention, an out-of-vocabulary score for speaker-independent recognition of user-defined phrases may be determined by first enrolling a user-defined phrase with a set of speaker-independent (SI) recognition models using an enrollment grammar. An enrollment grammar score of a spoken phrase may then be determined by comparing features of the spoken phrase to the SI recognition model using the enrollment grammar. The enrollment grammar score may be penalized to generate an out-of-vocabulary score.

More specifically, in accordance with one embodiment of the present invention, the enrollment grammar may be phonotactic grammar and the SI recognition models may comprise sub-word units. The enrollment grammar score may be penalized by adding a penalty to it to where the out-of-vocabulary score rejects between sixty (60) and eighty (80) percent of non-defined phrases. In a particular embodiment, the enrollment score may be penalized to where the out-of-vocabulary score rejects about seventy (70) percent of non-defined phrases.

Technical advantages of the present invention include providing a speaker-independent recognition system and method that substantially improve out-of-vocabulary rejection. In particular, spoken phrases may be scored against a penalized enrollment grammar score in addition to user-defined phrases. In cases where the penalized enrollment grammar score provides a better match than the user-defined phrases, the spoken phrase may be rejected as out-of-vocabulary. Conversely, the spoken phrase may be accepted as in-vocabulary where it better matches the user-defined phrase than the penalized enrollment grammar score. Accordingly, recognizing out-of-vocabulary phrases as in-vocabulary and associated errors such as dialing a wrong number may be mitigated.

Additional technical advantages of the present invention include providing an out-of-vocabulary rejection system and method using existing components of the speaker-independent recognition system. In particular, components of the enrollment system may be used to determine an out-of-vocabulary score. Accordingly, an additional recognition model need not be provided.

Other technical advantages of the present invention will be readily apparent to one skilled in the art from the following figures, descriptions, and claims.

BRIEF DESCRIPTION OF THE DRAWINGS

For a more complete understanding of the present invention and its advantages thereof, reference is now made to the following description taken in conjunction with the accompanying drawings, wherein like reference numerals represent like parts, in which.

DETAILED DESCRIPTION OF THE INVENTION

Figure 1:
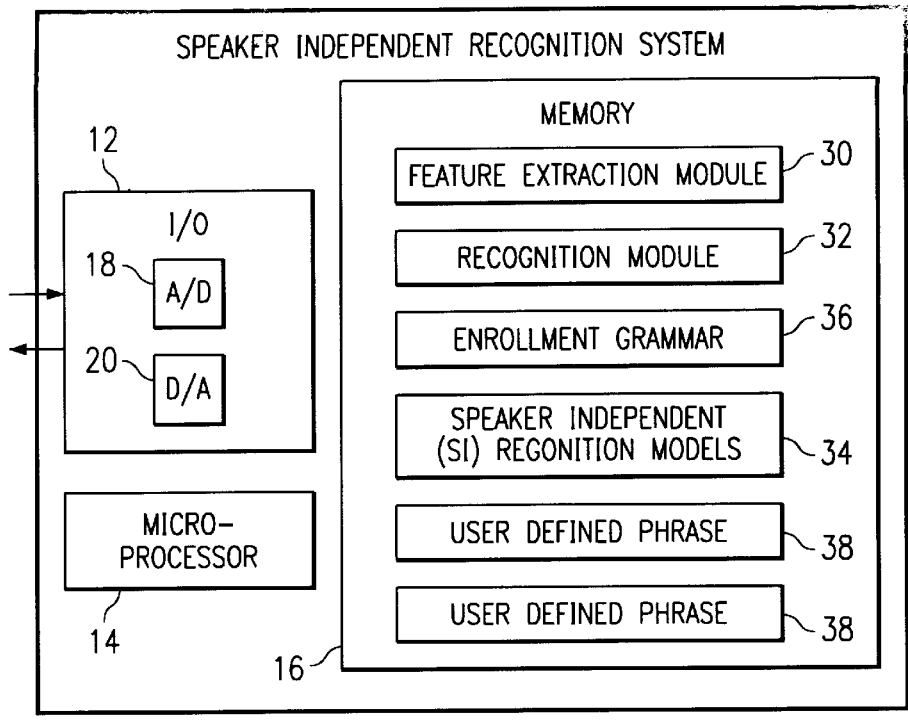
FIG. 1 illustrates a block diagram of a speaker-independent recognition system in accordance with one embodiment of the present invention.
Figure 2:
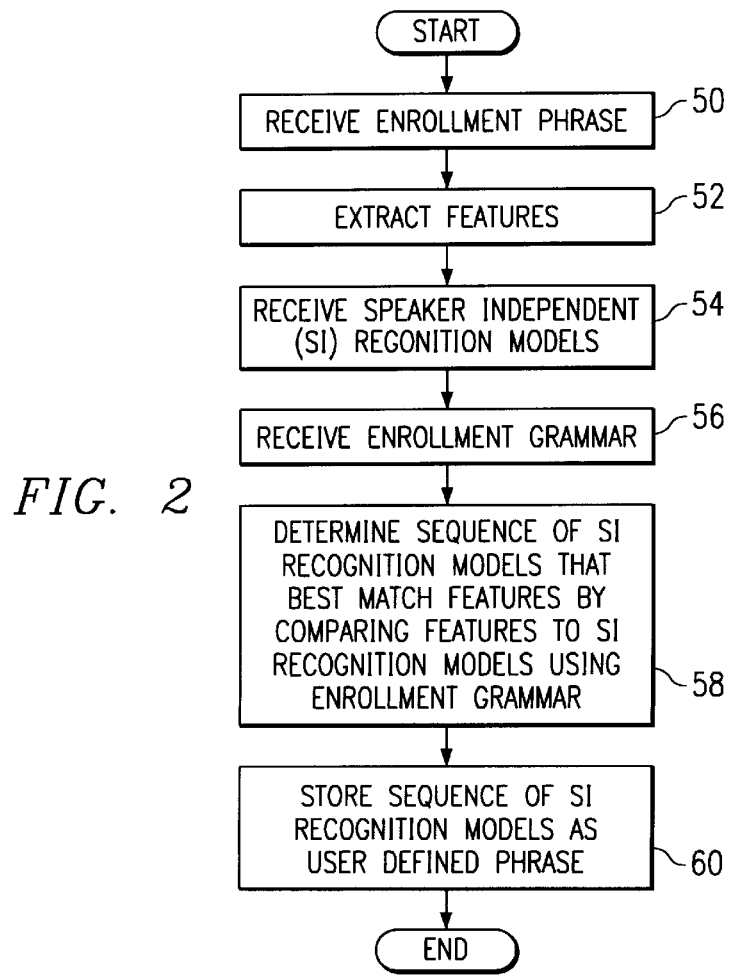
FIG. 2 illustrates a flow diagram of an enrollment method for the speaker-independent recognition system of FIG. 1 in accordance with one embodiment of the present invention.
Figure 3:
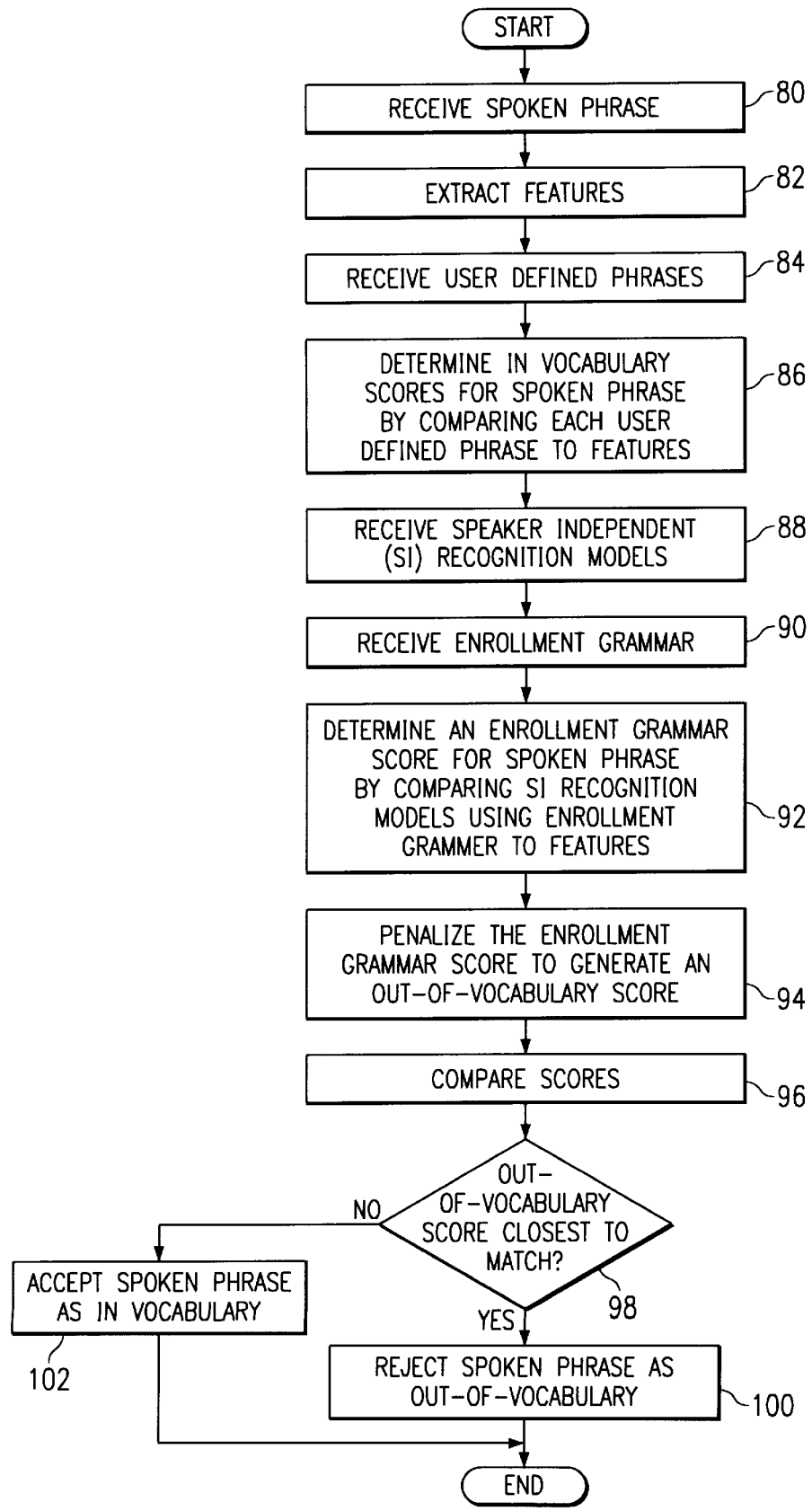
FIG. 3 illustrates a flow diagram of a recognition method for the speaker-independent recognition system of FIG. 1 in accordance with one embodiment of the present invention.

The preferred embodiments of the present invention and its advantages are best understood by referring now in more detail to FIGS. 1–3 of the drawings, in which like numerals refer to like parts. FIGS. 1–3 illustrate a method and system for speaker-independent recognition of user-defined phrases. As described in more detail below, the method and system may employ a penalized enrollment grammar score that may be scored against user-defined phrases for out-of-vocabulary rejection. Accordingly, the speaker-independent recognition system and method substantially improve out-of-vocabulary rejection.

FIG. 1 illustrates a block diagram of a speaker-independent recognition system 10 in accordance with one embodiment of the present invention. The speaker-independent recognition system 10 may comprise an input/output system 12, a microprocessor 14 and memory 16. The input/output system 12 may be connected to a telephony network (not shown) and provide voice-activated services such as speed-dialing. In this embodiment, the input/output system 12 may include an analog-to-digital converter 18 for converting analog input signals and a digital-to-analog converter 20 for converting digital output signals. It will be understood that input/output system 12 may be connected to other networks or systems capable of transmitting and/or processing speech signals.

The present invention includes computer software that may be loaded into the memory 16 and executed by the microprocessor 14. The computer software may be generally identified by modules and similar systems in memory 16. It will be understood that the computer software may be otherwise combined and/or divided for processing within the scope of the present invention. Accordingly, the labels of the modules and other software systems are for illustrative purposes and may be varied within the scope of the invention. The computer software may be loaded into memory 16 from disk storage (not shown). Disk storage may include a variety of types of storage media such as, for example, floppy disk drives, hard disk drives, CD-ROM drives or magnetic tape drives.

Memory 16 may include a feature extraction module 30, a recognition module 32, a set of speaker-independent (SI) recognition models 34, enrollment grammar 36, and user-defined phrases 38. The modules 30 and 32, models 34, grammar 36, and user-defined phrases 38 are shown in a single memory 16 for the convenience of the reader. It will be understood that the memory 16 may comprise one or more memory devices such as RAM, ROM, disk storage, and the like.

The feature extraction module 30 may extract features from a spoken phrase received through the input/output system 12. Typically, the features are obtained from a signal spectrum of the spoken phrase. In one embodiment, the spectrum may be computed using a linear predictive coding (LPC) method. It will be understood that features of the spoken phrase may be otherwise extracted within the scope of the present invention.

As described in more detail below, during enrollment, the recognition module 32 may operate in conjunction with the SI recognition models 34 and the enrollment grammar 36 to output a series of SI recognition models for the user-defined phrases 38. Additionally, during non-enrollment use, the output of the recognition module 32 may provide an enrollment grammar score that may be penalized and compared to the user-defined phrases 38 for out-of-vocabulary rejection.

The SI recognition models 34 may be sub-word units independent of any particular vocabulary. In one embodiment, the SI recognition models 34 may be context-dependent phone models. In this embodiment, the models are typically trained with input speech from a large number of speakers and vocabulary so that each phone model is well-trained. It will be understood that other types of SI recognition models 34 may be used within the scope of the present invention.

The enrollment grammar 34 may specify allowed sequences of acoustic-sequence of the models. In a simple embodiment, the enrollment grammar 36 may be a "null" grammar. In this embodiment, the grammar may allow any number of models to occur in any order. In another embodiment, the enrollment grammar 36 may be "n-gram" grammar. This grammar may specify the allowed sequences of length n. The enrollment grammar 36 may also be phonotactic grammar. Phonotactic grammar specifies the allowed sequences in terms of possible sound sequences in the language, such as possible syllables or demi-syllables. Accordingly, the enrollment grammar 36 acts as a constraint on the SI recognition models 34. It will be understood that other enrollment grammars 36 may be used within the scope of the present invention.

FIG. 2 illustrates an enrollment method for the speaker-independent recognition system 10 in accordance with one embodiment of the present invention. The method begins at step 50 wherein a phrase is received for enrollment into the speaker-independent recognition system 10. As previously described, the phrase may be received via the input/output system 12 and digitized by the analog-to-digital converter 18. The enrollment phrase may comprise any sound or sequence of sounds.

Proceeding to step 52, the feature extraction module 30 may extract features from the enrollment phrase. In one embodiment, the feature extraction module 30 may extract spectral features using linear predictive coding (LPC) parameters from each frame of the enrollment phrase. It will be understood that other feature extraction techniques may be used at step 52 within the scope of the present invention.

At step 54, the recognition module 32 may receive the SI recognition models 34. As previously described, the SI recognition models 34 may comprise sub-word units independent of any particular vocabulary. In a particular embodiment, the SI recognition models 34 may comprise context-dependent phone models trained with input speech from a large number of speakers and vocabulary.

Proceeding to step 56, the recognition module 32 may receive the enrollment grammar 36. As previously described, the enrollment grammar may comprise phonotactic grammar, n-gram grammar, or null grammar. It will be understood that the enrollment grammar may comprise other types of grammar within the scope of the present invention.

At step 58, the recognition module 32 may determine a sequence of SI recognition models that are the closest match to the extracted features. This may be done by comparing the extracted features to the SI recognition models 34 using the enrollment grammar 36. Next, at step 60, the recognition module 32 may store the sequence of SI recognition models as the user-defined phrase 38 for the enrollment phrase. The sequence of SI recognition models stored for the user-defined phrase may comprise a series of symbols associated with the SI recognition models. Step 60 leads to the end of the process.

FIG. 3 illustrates a recognition method for non-enrollment use of the speaker-independent recognition system 10 in accordance with one embodiment of the present invention. The method begins at step 80 wherein a spoken phrase is received. As previously described in connection with the enrollment phrase, the spoken phrase may comprise any sound or sequence of sounds and may be received through the input/output system 12. At the input/output system 12, the spoken phrase may be converted into a digital format by the analog-to-digital converter 18.

Proceeding to step 82, the feature extraction module 30 may extract features from the spoken phrase. As previously described, the extracted features may comprise spectral features based on linear predictive coding (LPC) parameters. As step 84, the recognition module 32 may receive the user-defined phrases 38. Continuing to step 86, the recognition module 32 may determine in-vocabulary scores for the spoken phrase by comparing each user-defined phrase 38 to the extracted features. The score may be the difference between the user-defined phrase and the extracted features.

Next, at step 88, the recognition module 32 may receive the SI recognition models 34. At step 90, the recognition module 32 may receive the enrollment grammar 36. The SI recognition models 34 and the enrollment grammar 36 are previously described in connection with FIGS. 1 and 2.

Proceeding to step 92, the recognition module 32 may determine an enrollment grammar score for the spoken phrase by comparing the SI recognition models 34 using the enrollment grammar 36 to the extracted features. The enrollment grammar score may be the difference between the SI recognition models 34 allowed by the grammar and the extracted features.

At step 94, the recognition module 32 may penalize the enrollment grammar score to generate an out-of-vocabulary score. In one embodiment, the recognition module 32 may penalize the enrollment grammar score by adding a penalty to the score. In one embodiment, the enrollment grammar score may be penalized to where the out-of-vocabulary score rejects between sixty (60) and eighty (80) percent of non-defined phrases. In a particular embodiment, the enrollment grammar score may be penalized to where the out-of-vocabulary score rejects about seventy (70) percent of non-defined phrases. It will be understood that the penalty may vary and be otherwise determined within the scope of the present invention.

At step 96, the scores may be compared by the recognition module 32. Next, at decisional step 98, the recognition module 32 may determine if the out-of-vocabulary score is the closest match to the spoken phrase. If the out-of-vocabulary score is the closest to matching the spoken phrase, the YES branch of decisional step 98 leads to step 100 wherein the spoken phrase is rejected as out-of-vocabulary. In this case, the speaker-independent recognition system 10 may request the speaker to repeat the phrase for re-recognition purposes.

Returning to decisional step 98, if the out-of-vocabulary score is not the closest match to the spoken phrase, the NO branch of decisional step 98 leads to step 102. At step 102, the recognition module 32 accepts the spoken phrase as an in-vocabulary phrase. Accordingly, the phrase has been recognized and may be acted upon. Steps 100 and 102 lead to the end of the process.

In accordance with the foregoing, the speaker-independent recognition system and method of the present invention substantially improves out-of-vocabulary rejection. In particular, spoken phrases may be scored against a penalized enrollment grammar score in addition to user-defined phrases. In cases where the penalized enrollment grammar score provides a better match than the user-defined phrases, the spoken phrase may be rejected as out-of-vocabulary. Conversely, the spoken phrase may be accepted as in-vocabulary where it better matches the user-defined phrase than the penalized enrollment grammar score.

Although the present invention has been described with several embodiments, various changes and modifications may be suggested to one skilled in the art. It is intended that the present invention encompass such changes and modifications as fall within the scope of the appended claims.

What is claimed is:

1. A method of determining an out-of-vocabulary score for speaker-independent recognition of user-defined phrases, comprising the steps of:

enrolling a user-defined phrase with a set of speaker-independent (SI) recognition models using an enrollment grammar;

determining an enrollment grammar score of a spoken phrase by comparing features of the spoken phrase to the SI recognition models using the enrollment grammar; and penalizing the enrollment grammar score to generate an out-of-vocabulary score and step of penalizing the enrollment grammar score comprising the step of adding a penalty to the enrollment grammar score.

2. The method of claim 1, wherein the enrollment grammar is a phonotactic grammar.

3. The method of claim 1, wherein the enrollment grammar is a null grammar.

4. The method of claim 1, wherein the enrollment grammar is an n-gram grammar.

5. The method of claim 1, wherein the SI recognition models comprise sub-word units.

6. The method of claim 1, wherein the SI recognition models comprise context-dependent phone models.

7. A method of determining an out-of-vocabulary score for speaker-independent recognition of user-defined phrases, comprising the steps of:

enrolling a user-defined phrase with a set of speaker-independent (SI) recognition models using an enrollment grammar;

determining an enrollment grammar score of a spoken phrase by comparing features of the spoken phrase to the SI recognition models using the enrollment grammar; and penalizing the enrollment grammar score to generate an out-of-vocabulary score, wherein the enrollment grammar score is penalized to where the out-of-vocabulary score rejects between sixty (60) and eighty (80) percent of non-defined phrases.

8. A method of determining an out-of-vocabulary score for speaker-independent recognition of user-defined phrases, comprising the steps of:

enrolling a user-defined phrase with a set of speaker-independent (SI) recognition models using an enrollment grammar;

determining an enrollment grammar score of a spoken phrase by comparing features of the spoken phrase to the SI recognition models using the enrollment grammar; and penalizing the enrollment grammar score to generate an out-of-vocabulary score, wherein the enrollment grammar score is penalized to where the out-of-vocabulary score grammar rejects about seventy (70) percent of non-defined phrases.

9. A method of speaker-independent recognition of user-defined phrases with out-of-vocabulary (OOV) rejection, comprising the steps of:

receiving a spoken phrase;

extracting features from the spoken phrase;

receiving a user-defined phrase;

determining an in-vocabulary score of the spoken phrase by comparing the extracted features to the user-defined phrase;

receiving a set of speaker-independent (SI) recognition models;

receiving an enrollment grammar;

determining an enrollment grammar score of the spoken phrase by comparing the extracted features to the SI recognition models using the enrollment grammar;

penalizing the enrollment grammar score to generate an out-of-vocabulary score;

accepting the spoken phrase for recognition as being in-vocabulary if the in-vocabulary score is better than the out-of-vocabulary score; and rejecting the spoken phrase for recognition as being out-of-vocabulary if the out-of-vocabulary score is better than the in-vocabulary score.

10. A method of speaker-independent recognition of user-defined phrases, comprising the steps of:

receiving a spoken phrase;

extracting features from the spoken phrase;

receiving a user-defined phrase;

determining an in-vocabulary score of the spoken phrase by comparing the extracted features to the user-defined phrase;

receiving a set of speaker-independent (SI) recognition models;

receiving an enrollment grammar;

determining an enrollment grammar score of the spoken phrase by comparing the extracted features to the SI recognition models using the enrollment grammar;

penalizing the enrollment grammar score to generate an out-of-vocabulary score;

comparing the scores;

if the out-of-vocabulary score is closer to a matching score, rejecting the spoken phrase as an out-of-vocabulary phrase; and if the out-of-vocabulary score is not closer to a matching score, accepting the spoken phrase as an in-vocabulary phrase, said step of penalizing the enrollment grammar score comprising the step of adding a penalty to the enrollment grammar score.

11. The method of claim 9, wherein the enrollment grammar is a phonotactic grammar.

12. The method of claim 9, wherein the grammar is a null grammar.

13. The method of claim 9, wherein the grammar is n-gram grammar.

14. The method of claim 9, wherein the SI recognition models comprise sub-word units.

15. The method of claim 9, wherein the SI recognition models comprise context-dependent phone models.

16. The method of claim 9, wherein the extracted features are LPC features.

17. A method of speaker-independent recognition of user-defined phrases, comprising the steps of:

receiving a spoken phrase;

extracting features from the spoken phrase;

receiving a user-defined phrase;

determining an in-vocabulary score of the spoken phrase by comparing the extracted features to the user-defined phrase;

receiving a set of speaker-independent (SI) recognition models;

receiving an enrollment grammar;

determining an enrollment grammar score of the spoken phrase by comparing the extracted features to the SI recognition models using the enrollment grammar;

penalizing the enrollment grammar score to generate an out-of-vocabulary score, comparing the scores;

if the out-of-vocabulary is closer to a matching score, rejecting the spoken phrase as an out-of-vocabulary phrase; and if the out-of-vocabulary is not closer to a matching score, accepting the spoken phrase as an in-vocabulary phrase, wherein the enrollment grammar score is penalized to where the out-of-vocabulary score rejects between sixty (60) and eighty (80) percent of non-defined phrases.

18. A method of speaker-independent recognition of user-defined phrases, comprising the steps of:

receiving a spoken phrase;

extracting features from the spoken phrase;

receiving a user-defined phrase;

determining an in-vocabulary score of the spoken phrase by comparing the extracted features to the user-defined phrase;

receiving a set of speaker-independent (SI) recognition models;

receiving an enrollment grammar;

determining an enrollment grammar score of the spoken phrase by comparing the extracted features to the SI recognition models using the enrollment grammar;

penalizing the enrollment grammar score to generate an out-of-vocabulary score;

comparing the scores;

if the out-of-vocabulary is closer to a matching score, rejecting the spoken phrase as an out-of-vocabulary phrase; and if the out-of-vocabulary is not closer to a matching score, accepting the spoken phrase as an in-vocabulary phrase, wherein the enrollment grammar score is penalized to where the out-of-vocabulary score rejects about seventy (70) percent of non-defined phrases.

19. A speaker-independent recognition system, comprising:

a set of speaker-independent (SI) recognition models;

an enrollment grammar;

a user-defined phrase enrolled with the SI recognition models using an enrollment grammar;

a recognition module operable to determine an enrollment grammar score of a spoken phrase using the SI recognition models and the enrollment grammar; and the recognition module operable to penalize the enrollment grammar score to generate an out-of-vocabulary score, further comprising:

the recognition module operable to determine an in-vocabulary score of the spoken phrase by comparing features of the spoken phrase to the user-defined phrase;

the recognition module operable to compare the scores;

the recognition module operable to reject the spoken phrase as an out-of-vocabulary phrase if the out-of-vocabulary score is closer to a matching score; and the recognition module operable to accept the spoken phrase as an in-vocabulary phrase if the out-of-vocabulary score is not closer to a matching score.

20. The system of claim 19, the SI recognition models further comprising sub-word units.

* * * * *